United States Patent
Bonicatto et al.

(10) Patent No.: US 8,762,820 B1
(45) Date of Patent: Jun. 24, 2014

(54) DATA COMMUNICATIONS VIA POWER LINE

(75) Inventors: Damian Bonicatto, Pequot Lakes, MN (US); Chad Wolter, Breezy Point, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 182 days.

(21) Appl. No.: 13/334,659

(22) Filed: Dec. 22, 2011

(51) Int. Cl.
| H03M 13/00 | (2006.01) |
| H04B 3/54 | (2006.01) |
| H04B 3/00 | (2006.01) |

(52) U.S. Cl.
CPC ... *H04B 3/54* (2013.01); *H04B 3/00* (2013.01)
USPC ............ 714/784; 375/260; 375/295; 375/350

(58) Field of Classification Search
CPC .......................... H04B 2203/5408; H04B 3/54
USPC ............................. 714/784; 375/260, 295, 350
See application file for complete search history.

(56) References Cited

U.S. PATENT DOCUMENTS

| 5,581,229 | A | 12/1996 | Hunt |
| 6,154,488 | A | 11/2000 | Hunt |
| 6,177,884 | B1 | 1/2001 | Hunt et al. |
| 6,998,963 | B2 | 2/2006 | Flen et al. |
| 7,102,490 | B2 | 9/2006 | Flen et al. |
| 7,145,438 | B2 | 12/2006 | Flen et al. |
| 7,180,412 | B2 | 2/2007 | Bonicatto et al. |
| 7,184,861 | B2 | 2/2007 | Petite |
| 7,209,840 | B2 | 4/2007 | Petite et al. |
| 7,224,740 | B2 | 5/2007 | Hunt |
| 7,236,765 | B2 | 6/2007 | Bonicatto et al. |
| 7,346,463 | B2 | 3/2008 | Petite et al. |
| 7,432,824 | B2 | 10/2008 | Flen et al. |
| 7,443,313 | B2 | 10/2008 | Davis et al. |
| 7,468,661 | B2 | 12/2008 | Petite et al. |
| 7,706,320 | B2 | 4/2010 | Davis et al. |
| 7,738,999 | B2 | 6/2010 | Petite |
| 7,742,393 | B2 | 6/2010 | Bonicatto et al. |
| 7,774,530 | B2 | 8/2010 | Haug et al. |
| 7,791,468 | B2 | 9/2010 | Bonicatto et al. |
| 7,877,218 | B2 | 1/2011 | Bonicatto et al. |
| 7,978,059 | B2 | 7/2011 | Petite et al. |
| 8,144,816 | B2 | 3/2012 | Bonicatto et al. |
| 8,144,820 | B2 | 3/2012 | Bonicatto |
| 8,194,789 | B2 | 6/2012 | Wolter et al. |
| 8,238,263 | B2 | 8/2012 | Kohout et al. |
| 2006/0224935 | A1* | 10/2006 | Cameron et al. ............... 714/752 |
| 2007/0266300 | A1* | 11/2007 | Ito et al. ........................ 714/770 |
| 2008/0304595 | A1 | 12/2008 | Haug et al. |
| 2011/0121952 | A1 | 5/2011 | Bonicatto et al. |
| 2011/0176598 | A1 | 7/2011 | Kohout et al. |

(Continued)

*Primary Examiner* — Sam Rizk
(74) *Attorney, Agent, or Firm* — Crawford Maunu PLLC

(57) ABSTRACT

Aspects are directed to communicating data over power distribution lines carrying alternating current, using a communication protocol for communicating data between endpoint devices and an upstream data-collecting device. From first symbols having a plurality of bits, at least two second symbols are generated, the second symbols respectively including different subsets of the bits in the first symbol. Each first symbol is split into second symbols having a predefined bit size for an encoding operation that operates on entire symbols having the predefined bit size (e.g., smaller than the bit size of the first symbols). The second symbols are encoded and combined according to the communication protocol. The encoded symbols are communicated over the power distribution lines based on timing indicated at least in part by the alternating current.

16 Claims, 5 Drawing Sheets

(56) References Cited

U.S. PATENT DOCUMENTS

| | | |
|---|---|---|
| 2011/0218686 A1 | 9/2011 | McHann, Jr. et al. |
| 2011/0249678 A1 | 10/2011 | Bonicatto et al. |
| 2011/0317784 A1* | 12/2011 | Schwager et al. ............ 375/295 |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0099628 A1* | 4/2012 | Kim et al. .................... 375/222 |
| 2012/0106664 A1 | 5/2012 | Bonicatto et al. |

* cited by examiner

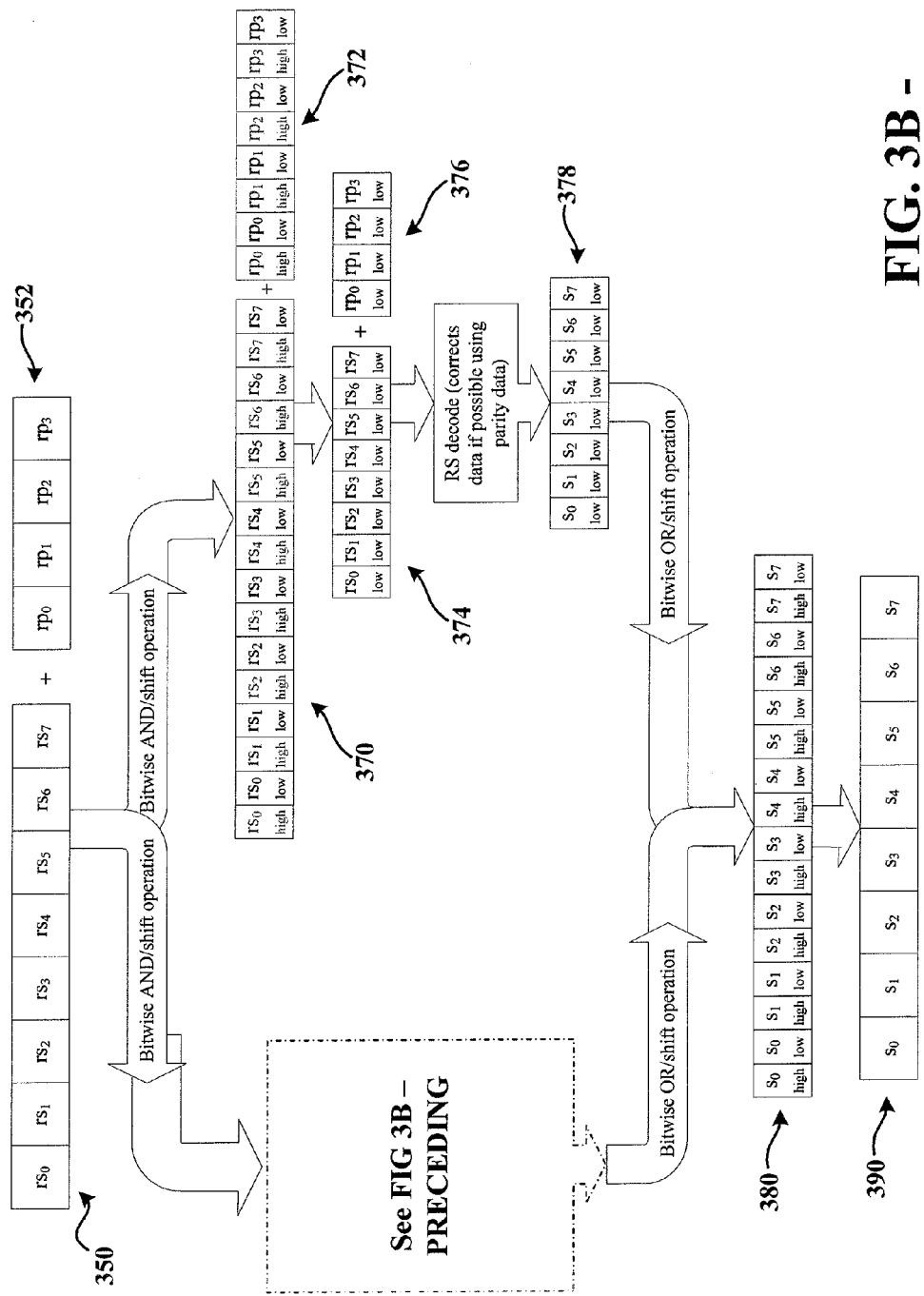
FIG. 3B - CONTINUED

DATA COMMUNICATIONS VIA POWER LINE

BACKGROUND

Service providers utilize distributed networks to provide services to customers over large geographic areas. For example, communications companies utilize a distributed communications network to provide communications services to customers. Similarly, power companies utilize a network of power lines and meters to provide power to customers throughout a geographic region and receive data back about the power usage. Other utility-based service providers, such as those providing water or gas, also utilize distributed network systems for providing the respective utilities.

These service providers are dependent on proper operation of their respective networks to deliver services to the customers. Often, it can be desirable or necessary to ascertain information regarding the services that are provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication (PLC) networks, endpoints in the network (e.g., meters, load control switches, remote service switches, and other endpoints) can provide updated information (e.g., power consumption information and/or endpoint operating status information) by transmitting data over power lines that also carry alternating current. However, effectively communicating such data can be challenging to accomplish, particularly in a timely manner. Moreover, capabilities of endpoint and other communication devices can be limited, as can aspects of transmission protocols amenable to implementation with PLC data transfer.

These and other matters have presented challenges to the communication of information over power lines.

SUMMARY

The present disclosure is directed to systems and methods for use with the communication of data over alternating current-carrying power lines. These and other aspects of the present disclosure are exemplified in a number of illustrated implementations and applications, some of which are shown in the figures and characterized in the claims section that follows.

Various embodiments are directed to communicating data over power distribution lines carrying alternating current using a communication protocol for communicating data between endpoint devices and an upstream data-collecting device. Specific aspects are directed to effecting such communications using an encoding approach that operates upon a subset of data in symbols to be communicated, facilitating one or both of processing function or lookup-table complexity. For instance, by processing subsets of data, processor resources required for algorithmic computation can be preserved. Similarly, memory circuit allocation can be preserved with respect to lookup-table storage requirements.

In more particular embodiments, data is communicated over power distribution lines carrying alternating current using such a communication protocol as follows. At least two second symbols are generated, respectively including different subsets of the bits in each first symbol. Encoded symbols are constructed by splitting each first symbol into second symbols having the predefined bit size, encoding the second symbols, and combining each of the encoded second symbols according to the communication protocol. This encoding is based, at least in part, on an encoding operation that operates on entire symbols (e.g., a cluster of unbroken symbols) having a predefined bit size that is smaller than the bit size of the first symbols. For example, various embodiments are directed to using an algorithm (e.g., a Reed-Solomon algorithm) to encode the second symbols. The encoded symbols are communicated over the power distribution lines based on timing indicated at least in part by the alternating current.

Another example embodiment is directed to an apparatus for communicating data over power distribution lines carrying alternating current using a communication protocol for communicating data between endpoint devices and an upstream data-collecting device, based on timing indicated at least in part by the alternating current. The apparatus includes an encoding circuit that generates, for each of a multitude of first symbols having a plurality of bits, at least two second symbols respectively including different subsets of the bits in the first symbol. The encoding circuit further constructs encoded symbols by, using an encoding operation that operates on entire symbols having a predefined bit size that is smaller than the bit size of the first symbols, encoding and combining each of the second symbols according to the communication protocol. The encoded symbols may then be communicated as above. In some embodiments, the apparatus includes a communication circuit that communicates the encoded symbols over the power distribution lines.

Another example embodiment is directed to a system for communicating data over power distribution lines as discussed above. The system includes both an encoding circuit, to encode data for communication as above, and a decoding circuit to decode data communicated via the encoding circuit. The encoding circuit generates, for each of a multitude of first symbols having a plurality of bits, at least two second symbols respectively including different subsets of the bits in the first symbol. The encoding circuit further constructs encoded symbols by encoding and combining each of the second symbols according to a communication protocol, using an encoding operation that operates on entire symbols having a predefined bit size that is smaller than the bit size of the first symbols. The decoding circuit correspondingly generates, for each of the encoded symbols, at least two second symbols respectively including different subsets of the bits in the encoded symbol. The decoding circuit further constructs decoded symbols by decoding and combining each of the decoded second symbols according to the communication protocol, also using a decoding operation that operates on entire symbols having a predefined bit size that is smaller than the bit size of the first symbols.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
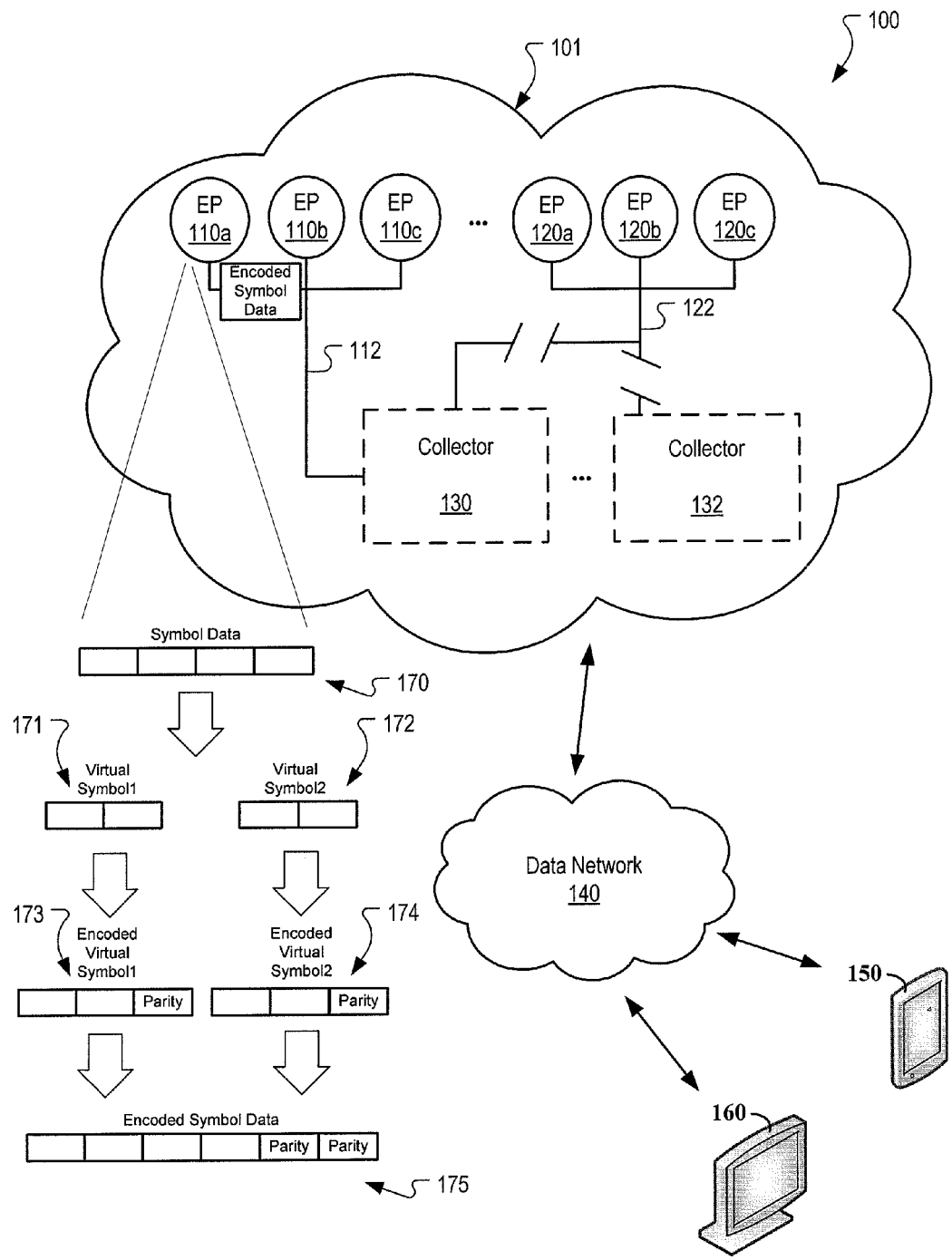
FIG. 1 is a block diagram of an example network environment in which endpoints transmit data, consistent with one or more embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for communicating data over current-carrying power lines. While the present disclosure is not necessarily limited to such applications, various aspects of the invention may be appreciated through a discussion of various examples using this context.

Various example embodiments of the instant disclosure are directed to communicating data over power distribution lines carrying alternating current, using an approach that permits the encoding of relatively large symbols using an efficient and processor-desirable approach. Symbols are arranged in smaller symbols having a bit size corresponding to an encoding operation, and the smaller symbols are encoded and combined according to a power-line communication protocol for communicating data on lines carrying alternating current. This encoding may, for example, be carried out upon smaller symbols generated from a cluster of larger symbols. The encoded and combined symbols are communicated over the power distribution lines, based on timing indicated at least in part by the alternating current.

In accordance with a more specific example embodiment, data is communicated over power distribution lines carrying alternating current, using a communication protocol for communicating data between endpoint devices and an upstream data-collecting device. For each of a multitude of first symbols having a plurality of bits, at least two second symbols are generated to include different subsets of the bits in the first symbol. Using (at least in part) an encoding operation that operates on entire symbols having a predefined bit size that is smaller than the bit size of the first symbols, encoded symbols are constructed by splitting each first symbol into second symbols having the predefined bit size. The number of subsets (and corresponding second symbols) can be selected based upon a number of bits in the symbol from which the second symbols are created.

The second symbols are encoded and combined according to the communication protocol, then communicated over the power distribution lines based on timing indicated at least in part by the alternating current. A variety of types of encoding operations may be carried out to suit particular needs. In certain embodiments, a Reed-Solomon algorithm is used to encode the second (or smaller) symbols such as discussed above. For example, a circuit-based encoder may be implemented to execute a Reed-Solomon algorithm, by processing second symbols generated from an incoming (first) symbol.

In some instances, symbols to be split and encoded (first symbols, as discussed above) are formed by combining bits (e.g., from utility-based data) to generate the first symbols according to the communication protocol, with the encoding carried out upon a smaller symbol size. Accordingly, encoding functions can be carried for use with a variety of communication protocols and symbol lengths. In various implementations, generating second/smaller symbols from a first symbol can be implemented such that the second symbol is of a bit size that facilitates at least one of an offset of look-up-table memory space or computation-time required for the encoding.

In various implementations, the generation and encoding of second symbols may involve generating symbols having a number of bits corresponding to a processing capability at a particular endpoint. In this context, different sizes of symbols can be generated to suit a particular need. Further, the symbol size can be tailored to each endpoint, for different types of endpoints, and to different types of sources from which the data is obtained (e.g., as may pertain to different types of utility readings).

As consistent with the above discussion, encoding second symbols may involve one or more of a variety of approaches. Certain approaches involve using an algorithm-based function for an encoding scheme. Other approaches involve using a lookup table as part of an encoding scheme. Still other embodiments involve using a combination of algorithm-based functions and a lookup table as part of an encoding scheme. Various embodiments are directed to encoding second symbols as discussed above, using one or more of these approaches. Moreover, the encoding and symbol construction can be carried out using a computer processor, which executes an encoding algorithm and/or accesses an appropriate lookup table.

A variety of different types of data can be processed and communicated using the embodiments and implementations as discussed herein. For example, data corresponding to utility-based information can be encoded and communicated over current-carrying power lines. Such data may include, for example, one or more of electrical usage data, peak energy use data, gas usage data, water usage data, diagnostic data, and voltage-based data (e.g., status data).

The symbols as encoded and communicated herein can be used in a variety of manners. In some embodiments, second symbols as discussed herein are extracted from the encoded symbols (e.g., which include two or more second symbols), and the extracted second symbols are decoded. The decoded symbols are then combined to regenerate the multitude of symbols from which the second symbols were originally obtained (prior to transmission).

Another example embodiment is directed to a communication apparatus that communicates data over power distribution lines carrying alternating current, using a communication protocol that facilitates communications between endpoint devices and an upstream data-collecting device, and based on timing indicated at least in part by the alternating current. The apparatus includes a communication circuit that communicates the encoded symbols over the power distribution lines, and an encoding circuit that encodes symbols for communication. More specifically, the encoding circuit generates, for each of a multitude of first symbols having a plurality of bits, at least two second symbols respectively including different subsets of the bits in the first symbol. The number of second symbols can be set based upon a number of bits in the respective one of the multitude of symbols for which the second symbols are created. The encoding circuit further constructs encoded symbols from the at least two symbols, using an encoding operation that operates on entire symbols having a predefined bit size that is smaller than the bit size of the first symbols. The encoded symbols are also combined according to the communication protocol.

The communication apparatus may also include and/or be configured with functionality in accordance with one or more embodiments as discussed hereinabove, such as those involving a Reed-Solomon encoding operation. In some instances, the encoding circuit generates encoded second symbols and parity bits, using bits in a first symbol, for communication according to a protocol for the power distribution lines. In a more particular embodiment, the encoding circuit encodes and combines the second symbols to construct encoded symbols by splitting each first symbol into second symbols having a predefined bit size corresponding to the Reed-Solomon encoding operation, and then encoding the second symbols using a Reed-Solomon encoding operation that operates on entire symbols having the predefined bit size. The resulting encoded symbols are constructed for transmission by combining the second symbols processed via the Reed-Solomon encoding function.

In a more specific embodiment, the encoding circuit includes a buffer circuit that buffers incoming (first) symbols, and a bitwise AND/shift circuit that is connected to receive an output of the first symbols from the buffer circuit and generate the at least two second symbols therefrom. An encoder circuit is connected to receive the second symbols from the bitwise AND/shift circuit and encodes the second symbols, which are presented to a bitwise OR/shift circuit that combines the encoded second symbols. Another buffer circuit is connected to the bitwise OR/shift circuit and provides the combined encoded second symbols for communication on the power distribution lines.

In some embodiments, the communication apparatus also includes an extraction circuit, communicatively coupled to the encoding circuit via power transmission lines as discussed above. The extraction circuit extracts the second symbols from the communicated encoded symbols, decodes the extracted second symbols and combines the extracted second symbols to regenerate the first symbols.

In some implementations, the extraction circuit includes a buffer circuit and an AND circuit, the AND circuit connected to receive the encoded symbols via the power distribution lines, and operative to regenerate the at least two second symbols. A decoder circuit is connected to receive the regenerated encoded second symbols and decodes the regenerated encoded second symbols. A bitwise OR/shift circuit and a buffer circuit are connected to receive the decoded second symbols from the decoder circuit, combine the decoded second symbols and provide the combined decoded second symbols for access.

Another example embodiment is directed to a system for communicating data over power distribution lines carrying alternating current using a communication protocol for communicating data between endpoint devices and an upstream data-collecting device, the communication being based upon timing indicated at least in part by the alternating current. The system includes an encoding circuit and a decoding circuit, which may be implemented as discussed above to generate encoded symbols from a larger symbol, communicate the encoded symbols, decode the symbols and reassemble a the larger symbol (and/or data therein) after communication.

Turning now to the Figures, FIG. 1 is a block diagram of an example network environment 100 in which endpoints transmit data. The network environment 100 includes a service network 101 in which a plurality of endpoints including endpoints 110a-110c and 120a-120c are coupled (e.g., communicatively coupled) to collectors 130 and 132 (e.g., data collectors). The number of endpoints and collectors can vary, depending upon the application, with the number shown in FIG. 1 being by way of example. Further, different numbers of endpoints can be grouped together as shown, in larger and/or smaller groups, with one or more collectors assigned to each group.

The respective endpoints are connected to the one or more collectors via a power distribution network including one or more power lines, with power lines 112 and 122 shown by way of example. The power lines 112 and 122 carry alternating current, and the data is communicated along with the alternating current and according to aspects thereof (e.g., frequency and timing of the data communication is set according to the alternating current passing through the power lines).

Various embodiments are directed to communications over the power lines 112 and 122, using circuitry and functionality at one or both of the endpoints and the collectors. Each of the endpoints 110a-110c and 120a-120c processes symbol data by generating and encoding two or more virtual symbols having a number of bits amendable to an encoding function to be carried out upon the bits for transmission over the power lines 112 and 122. Similarly, each of the collectors 130 and 132 processes data received over the power lines 112 and 122 by splitting the data into encoded virtual symbols, decoding the symbols, and providing data from the decoded symbols for access.

The collectors 130 and 132 may be further configured to communicate decoded symbols over a data network 140 (e.g., such as a LAN, WAN, and/or the Internet) to end-user devices such as 150 and 160. For example, where data received at endpoint 110a pertains to a particular business or residential address, the data can be provided to a user at the business (e.g., an employee) or at the residence (e.g., a resident or owner). Using these approaches, data such as utility meter data, diagnostic data or status data can be provided directly to users or operators.

The endpoints 110a-110c and 120a-120c and collectors 130 and 132 process symbol data as discussed above, to facilitate the encoding of entire symbols having a symbol size that is smaller than the size of symbols to be transmitted. By way of example, incoming symbol data 170 (e.g., as representative of symbols in a cluster of symbols) is processed for communication over the service network 101 as shown. The symbol data 170 has data portions that are separated for processing into two virtual symbols 171 and 172, respectively including a subset of the data in symbol 170. Where symbol data 170 has an even number of bits, the virtual symbols may be formed respectively having half of the bits. Where symbol data 170 has an odd number of bits, one of the virtual symbols can be padded with a bit (e.g., with a zero) so that the resulting virtual symbols are of a common length. The respective virtual symbols are encoded to generate encoded virtual symbols 173 and 174 with parity data. These encoded virtual symbols are combined to generate encoded symbol 175, for communication over the power lines 112 and 122. In this context, several symbols (e.g., a cluster of symbols) may be separated into virtual symbols as shown with symbol data 170, and the cluster of virtual symbols may be processed to generate encoded symbols (e.g., with an error correction code).

At the collectors 130 and 132, each encoded symbol 175 is processed in a similar manner but for extracting data. Following a reverse flow, each encoded symbol 175 can be split into encoded virtual symbols 173 and 174, which can be decoded to provide virtual symbols 171 and 172. Original symbol data 170 (as may be checked/corrected via the parity data) can be reconstructed at the collectors and used to obtain utility-based information provided at the endpoints. As discussed above, a cluster of such symbols may be processed and communicated accordingly.

The endpoints 110a-110c and 120a-120c can be implemented in a variety of manners. In some embodiments, the endpoints are connected to or part of meters in a utility network, computing devices, television set top terminals or telephones that transmit data in the service network 101. The description that follows refers to the endpoints 110a-110c and 120a-120c as power meters in a power distribution network. However, the description herein is applicable to other types of endpoints in utility networks or other networks. For example, the various endpoints herein may be implemented as part of and/or in connection with gas meters, water meters, status-reporting devices and diagnostic devices.

Various aspects of the network environment 100 can be implemented in accordance with one or more embodiments and implementations as discussed above, for communicating utility-based data. For example, utility-based data obtained from endpoints 110a-110c and 120a-120c, can be communicated to one or more collectors 130 and 132 using respective communication circuits (e.g., transmitters, receivers or transceivers) with one or more processing circuits to carry out respective communication, interleaving, interpreting and presentation-based functions as discussed herein. Moreover, several embodiments are directed to one or more different sub-parts as shown in FIG. 1 (e.g., to an endpoint, to a collector, or to circuits within the respective endpoints and collectors such as communication circuits and processing circuits), to distributed processor circuits at different points in the network, and to systems involving some or all of the different components and/or aspects of the network.

In some implementations, the endpoints 110a-110c and 120a-120c implement a processor circuit to encode data for communication as follows. First symbols having a plurality of bits are split into at least two second symbols respectively including different subsets of the bits in the first symbol. The number of second symbols can be set based upon a number of bits in the respective one of the multitude of symbols for which the second symbols are created. The processor circuit further constructs encoded symbols from the at least two symbols, using an encoding operation such as a Reed-Solomon operation, that operates on entire symbols having a predefined bit size that is smaller than the bit size of the first symbols. This process may involve, for example, encoding one of the subsets to generate parity data. The encoded symbols/data are also combined according to the communication protocol, and communicated to one or more of the collectors 130 and 132 via one of the power lines 112 and 122. The data in the symbols can then be provided to users at 150 and/or 160, via data network 140.

The endpoints 110a-110c and 120a-120c report utility-based data over communications channels within power-distribution lines 112 and 122, with separate lines shown by way of example connecting the set of endpoints 120a-120c to two collectors 130 and 132. Communications channels are portions of spectrum over which data are transmitted within the power-distribution lines. The center frequency and bandwidth of each communications channel can depend on the communications system in which they are implemented. In some implementations, the communications channels for utility meters (e.g., power, gas and/or water meters) can be implemented in power line communication networks that dynamically allocate available bandwidth according to an orthogonal frequency division multiple access (OFDMA) spectrum allocation technique or another channel allocation technique such as time division multiple access (TDMA), code division multiple access (CDMA), and other frequency division multiple access techniques.

In certain embodiments, the endpoints 110a-110c and 120a-120c are implemented as power meters in a power distribution network and transmit reporting data that specify meter information, such as information characterizing measures of total power consumption, power consumption over a specified period of time, peak power consumption, instantaneous voltage, peak voltage, minimum voltage and other measures related to power consumption and power management (e.g., load information). Each of the power meters can also transmit status data that specify a status of the power meter (e.g., operating in a normal operating mode, emergency power mode, or another state such as a recovery state following a power outage).

In some implementations, symbols (i.e., representing one or more bits) including the reporting and/or the status data are continuously or intermittently transmitted over a specified symbol period, in accordance with approaches described herein for the creation and encoding of two or more virtual symbols. A symbol period is a period of time over which a particular symbol is transmitted.

For example, when a particular meter is required to provide updated meter information every 15 minutes (e.g., as a specified update rate for the meter), a meter can transmit a data set representing a first set of updated meter information at a first fifteen-minute interval, and then transmit another data set representing a next set of updated meter information at a subsequent fifteen-minute interval. The update rate for a meter can be specified by a network administrator based, for example, on types and amounts of updated meter information that are being received from the meter, preferences of a customer (e.g., a power company) to whom the data is being provided, and/or channel characteristics of the channel over which the data is being transmitted. An update rate of 15 minutes is used for purposes of example, but other update rates (e.g., 1 minute, 5 minutes, 10 minutes, 1 hour, or 1 day) can be used. Moreover, various embodiments are directed to setting such update rates at a remote location such as via collector 130, communicating such information to an endpoint 110a, and using that information at the endpoint to control both the collection and encoding/transmission aspects as discussed herein.

As consistent with various example embodiments described herein, a single collector (e.g., 130) may receive data from thousands of endpoints and provide access to the data by transmitting the data sets to one or more devices 150 and 160, via data network 140. A single collector can thus receive data from thousands of different endpoints in a network and over thousands of different channels. Such data can be used, for example, to control aspects of the network 101 based at least in part on information extracted from the data. For example, in a power line communication (PLC) network, data in the symbol 170 can be used to characterize power usage, in response to which aspects of the provision of power via the power distribution lines 112, 122 may be controlled. In other implementations, the collectors 130 and 132 themselves use data to control or otherwise operate aspects of the service network 101.

The data network 140 can be a wide area network (WAN), local area network (LAN), the Internet, or any other communications network. The data network 140 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. Further, the service network 101 can include many different endpoints, collectors, distribution lines and interfaces.

Symbols from a particular endpoint (e.g., 110a) may be transmitted over one of thousands of communications channels in a PLC system. For example, each endpoint can be assigned a particular channel using OFDMA or another channel allocation technique. Channel assignments for the endpoints 110a-110c, 120a-120c that communicate with particular collectors 130 and 132 can be stored, for example, in a communications data storage circuit in or connected to collector 132. A similar data storage circuit may also be implemented with collector 130 and with the endpoints 110a-110c and 120a-120c for storing data sets to be communicated, or may be implemented with memory within the respective components. In addition, data may be stored to identify aspects such as an index of endpoints, a channel that each respective endpoint has been assigned, and the collector that is responsible for receiving data sets transmitted by the respective endpoints.

A collector can use stored channel assignment data, for example, to determine which endpoint transmitted data that is received over each of the communications channels, to associate received data (e.g., meter data, status data, diagnostic data) with the proper endpoint. In turn, the collector can log(i.e., store) the data sets based on the identity of the endpoint that transmitted the data sets. Various approaches can be used to identify which endpoint a particular set of data corresponds to.

The endpoints 110a-110c and 120a-120c can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure). Accordingly, the collectors 130 and 132 provide data for access by user devices 150 and 160 that can be accessed, for example, by a network operator, maintenance personnel and/or customers. For example, data identifying increased power usage described above can be provided to a computer device 160 accessible by the network operator, who can, in turn, determine an appropriate action regarding the increased usage. Additionally, data identifying a time-of-use measure and/or a peak demand measure can also be provided to the devices 150 and 160. Similarly, if there has been a power outage, data can be provided to a hand-held device 150 to notify a customer of the outage, and in some instances, information estimating a duration of the outage or providing other status data therefrom (e.g., confirmation of re-establishment of utility services).

Figure 2:
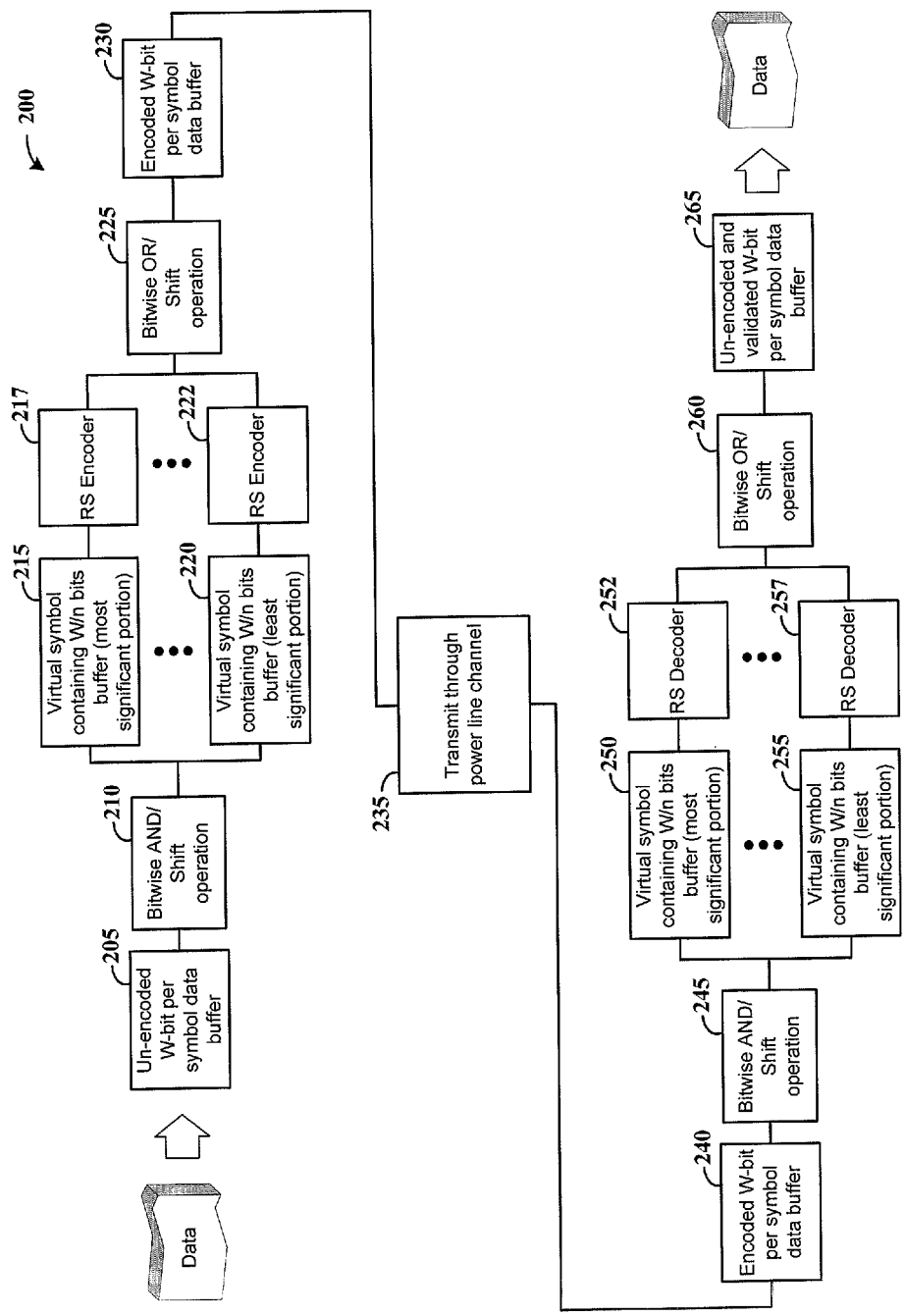
FIG. 2 is a system/data flow diagram for communicating time-based data over power distribution lines, consistent with other embodiments of the present disclosure.

Turning now to FIG. 2, a system 200 and data flow diagram is shown for communicating time-based data over power distribution lines, consistent with one or more example embodiments. The system 200 operates to encode data using an encoding operation (shown by way of example as Reed-Solomon encoding) that functions upon whole symbols (first symbols) having a predetermined number of bits, and does so to operate upon and transmit at least some symbols having a number of bits larger than the predetermined number.

An un-encoded W-bit per symbol data buffer 205 buffers incoming data, which is then processed by a bitwise AND/shift at block 210 to generate virtual (second) symbols corresponding to a portion of the incoming data and having a size amenable to a particular encoding operation to be performed. These virtual symbols are buffered respectively at buffers 215 and 220, and passed to encoders 217 and 222. After encoding, the encoded symbols are processed at a bitwise OR/shift operation 225 for recombining the virtual symbols for transmission on a power line. The recombined virtual symbols are buffered at block 230 and transmitted over a power line channel 235.

At a receiving end, an encoded W-bit per symbol data buffer 240 buffers the encoded and transmitted symbols received via the power line channel 235, and a bitwise AND/shift block 245 processes the symbols for presenting virtual symbols for decoding. The virtual symbols are buffered at 250 and 255 and decoded at decoders 252 and 257, then passed to a bitwise OR/shift block 260 and to un-encoded and validated W-bit per symbol data buffer 265.

The number of buffers and corresponding encoders can vary to correspond to an initial symbol size and a symbol size limit for the particular encoding operation to be performed. While FIG. 2 shows pairs of buffers and encoders, additional buffers and encoders may be employed (physically and/or functionally) to carry out the transmission of data as discussed herein. The number of virtual symbols thus corresponds to a value W/n as related to an original symbol size "W" and a number "n" of virtual symbols into which the original symbol needs to be split so that the virtual symbols do not exceed a predetermined size for the encoding function carried out at the respective encoders.

For example, with an original "W" bit size that is three times the number of bits that an encoding operation is limited to, the value "n" would be set to three and three virtual symbols would be generated for each incoming bit. In such an application, the number of buffers 215/220/250/255 and encoders 217/222/252/257 would be set to three each as well. In such contexts, various embodiments are directed to apparatuses that may employ two or more buffers/encoders, with some or all of the buffers/encoders being implemented for specific applications. In certain embodiments, a single buffer and a single encoder may be used to separately process the virtual symbols.

The respective blocks as shown in FIG. 2 can be implemented all or in part, in connection with various example embodiments. For instance, some embodiments are directed to an encoding operation prior to transmission through the power channel 235, and to one or more circuits and/or devices that carry out the respective functions as depicted in blocks 205-230 and discussed above. Other embodiments are directed to a decoding operation after transmission through the power channel 235, or to one or more circuits and/or devices that carry out the respective functions as carried out in blocks 240-260. Still other embodiments involve a system, as may include a combination of various aspects carrying out both encoding and decoding functions, with processing functions carried out at different locations with communications effected via the power channel 235, as may be established between endpoints and a collector or other type of component.

Figure 3A:
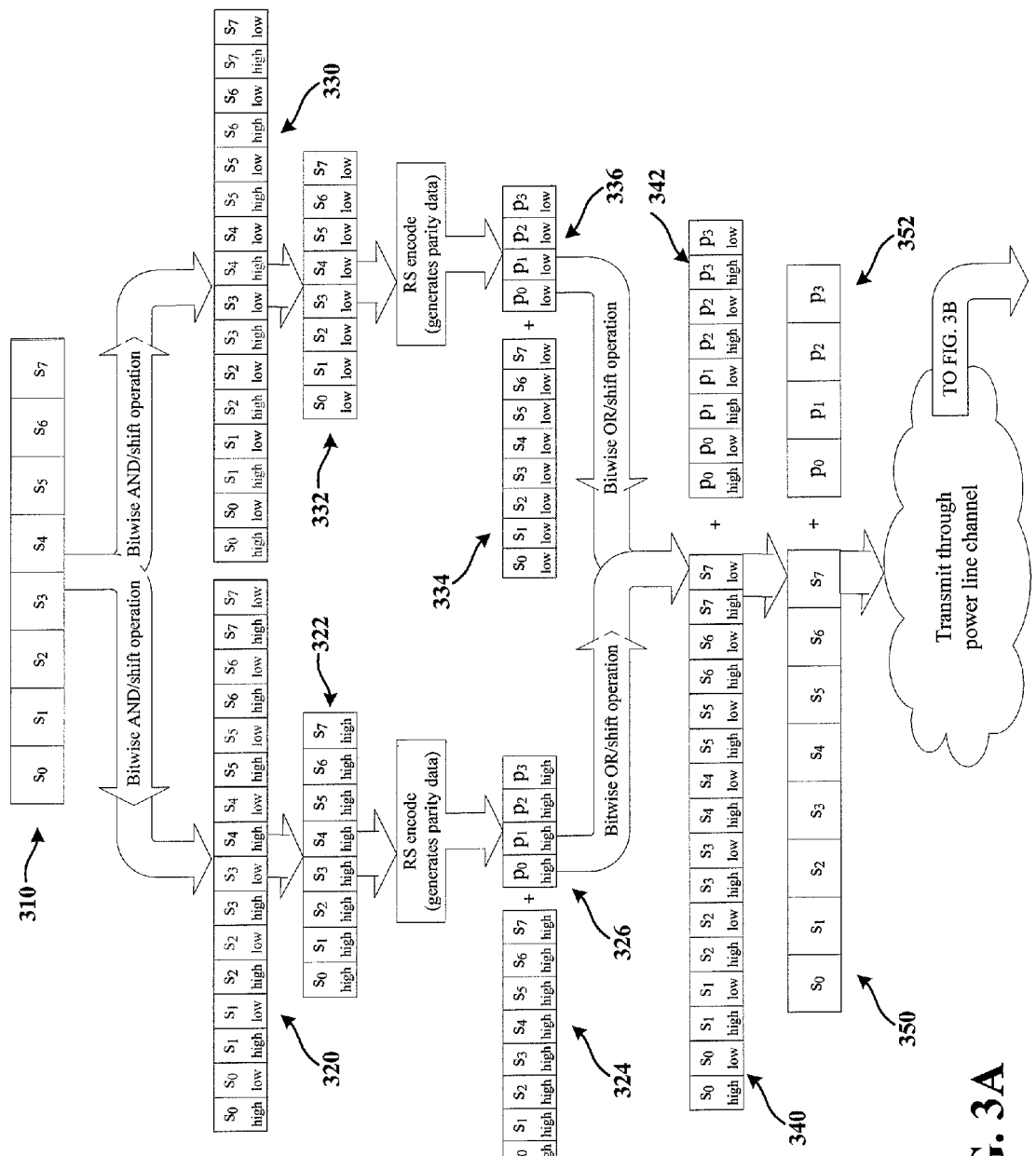
FIG. 3A shows a system/data flow diagram for encoding data for communication over power distribution lines, consistent with other embodiments of the present disclosure.

FIG. 3A shows a system/data flow diagram for encoding data for communication over power distribution lines, consistent with other embodiments of the present disclosure. Data 310 (as may be stored in a data buffer) is shown as being split, encoded and recombined for transmission. The data 310 includes symbols $s_0$-$s_7$, with symbols $s_n$ containing W bits per symbol. A bitwise AND/shift operation is carried out to generate symbols (e.g., virtual symbols) 320 and 330. Symbols 320 include symbols $s_{0high}$-$s_{7high}$ that are the most significant portion of the symbols $s_0$-$s_7$ with symbols $s_{nhigh}$ containing W/2 bits per symbol. Symbols 330 include symbols $s_{0low}$-$s_{7low}$ that are the least significant portion of the symbols $s_0$-$s_7$ with symbols $s_{nlow}$ containing W/2 bits per symbol. Where the number of bits (W) in each symbol in 310 is not divisible by 2, a bit is padded with a zero to facilitate processing (e.g., a most significant bit of low data can be padded with a zero).

Symbols 322 include the high (most significant) bits of symbols 320, and symbols 332 are generated to include the low (least significant) bits of symbols 330. Other embodiments are directed to splitting the symbols 320 and 330 in other manners, such as by respectively including alternating bits or sets of bits. The symbols 322 and 332 are respectively encoded to generate encoded symbols 324 and 334 with parity data 326 and 336 for each set of encoded symbols. Parity data 326 and 336 include W/2 bits per symbol as respectively generated from $s_{0high}$-$s_{7high}$ virtual symbols, and from $s_{0low}$-$s_{7low}$ virtual symbols.

After the symbols are encoded, a bitwise OR/shift operation is carried out to combine the encoded bits and parity and produce symbols 340 and parity data 342. The respective bits are combined to form data 350 and parity data 352 for transmission on a power line channel as discussed herein. Parity data 352 includes W bits per symbol generated from combining $p_{0high}$-$p_{3high}$ and $p_{0low}$-$p_{3low}$.

Figure 3B:
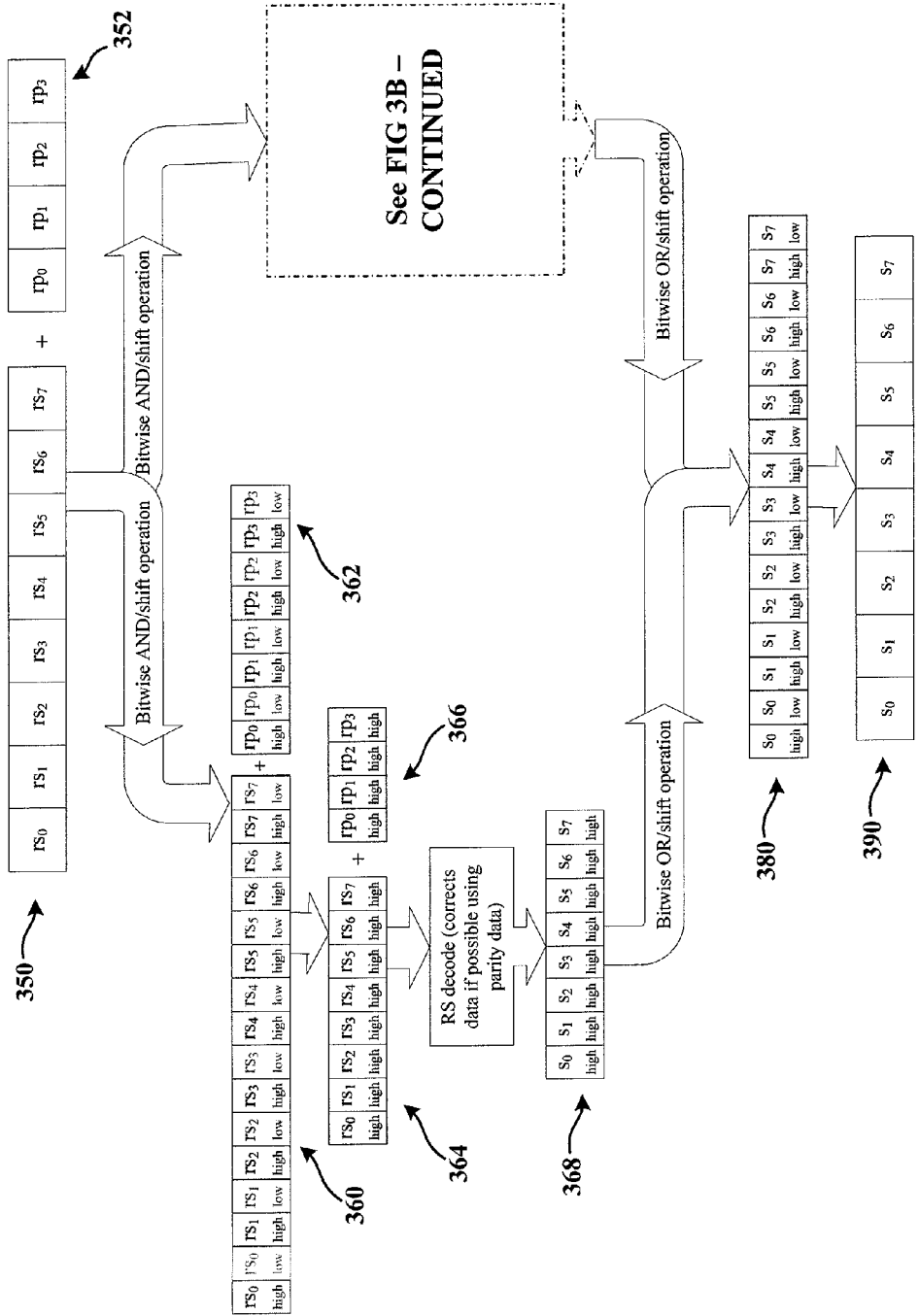
FIG. 3B shows a system/data flow diagram for decoding data communicated over power distribution lines and as may be implemented with FIG. 3A, consistent with other embodiments of the present disclosure.

Turning now to FIG. 3B, a system/data flow diagram is shown decoding data communicated over power distribution lines, consistent with other embodiments of the present disclosure. By way of example, FIG. 3B is shown and described as being implemented for decoding data 350 using parity 352 as generated in FIG. 3A.

Data 350 and parity bits 352 are received over a power line (e.g., and stored in a data buffer), and includes symbols $rs_0$-$rs_7$, with symbols $rs_n$ containing W bits per symbol and "virtual" parity symbols $rp_0$-$rp_3$ containing W bits per symbol. The data 350 and bits 352 are processed through a bitwise AND/shift operation to generate virtual symbols 360 and 370, and parity 362 and 372.

The virtual symbols 360 and 370 are processed, along with the parity data 362 and 372, to provide symbols 364 and 374. The symbols 364 include $rs_{0high}$-$rs_{7high}$ that are the most significant portion of the symbols $rs_0$-$rs_7$ with symbols $rs_{nhigh}$ containing W/2 bits per symbol. Symbols 374 include symbols $rs_{0low}$-$rs_{7low}$ that are the least significant portion of the symbols $rs_0$-$rs_7$ with symbols $rs_{nlow}$ containing W/2 bits per symbol. As discussed above, where an even number of symbols are not presented, one or more bits may be padded.

Symbols 364 and 374 are respectively decoded using parity data 366 and 376, to generate symbols 368 and 378. If the data is decoded correctly, this produces the original $s_n$ symbols that were provided as inputs to the encoder function in FIG. 3A. These symbols 368 and 378 are combined using a bitwise OR/shift operation to generate symbols 380, and data 390 that should match the input data 310 in FIG. 3A, as corrected (if applicable).

To provide for interaction with a user, various embodiments are directed to implementation on a computer having a display device such as a LCD (liquid crystal display) monitor or touch-screen for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Various embodiments described herein can be implemented in a computing system that includes a back-end component, e.g., as a data server, or that includes a middleware component, e.g., an application server, or that includes a front-end component, e.g., a client computer having a graphical user interface. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Systems as described herein can include clients and servers. A client and server are generally remote from each other and may interact through a communication network such as described herein. The relationship of client and server arises by virtue of computer programs running on the respective computers and having a client-server relationship to each other. In some embodiments, a server transmits data to a client device (e.g., for purposes of controlling the client device, or displaying data to and receiving user input from a user interacting with the client device). Data generated at the client device (e.g., a result of the user interaction) can be received from the client device at the server.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, a block denoting "C=A+B" is an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the invention. Based on the above discussion and illustrations, those skilled in the art will readily recognize that various modifications and changes may be made to the present invention without strictly following the exemplary embodiments and applications illustrated and described herein. For instance, such changes may include variations on mechanisms for synchronization with (and/or tracking of) the AC line frequency. Such modifications and changes do not depart from the true spirit and scope of the present invention, including aspects set forth in the following claims.

What is claimed is:

1. A method for communicating data over power distribution lines carrying alternating current using a communication protocol for communicating data between endpoint devices and an upstream data-collecting device, the method comprising:
for each of a multitude of first symbols having a plurality of bits, generating at least two second symbols respectively including different subsets of the bits in the first symbol, wherein generating at least two second symbols includes, at each of at least two different endpoints, generating at least two second symbols having a number of bits that is different for the at least two endpoints, based upon communication capabilities of the endpoint for which the second symbols are generated;
based at least in part on an encoding operation that operates on entire symbols having a predefined bit size that is smaller than the bit size of the first symbols, constructing encoded symbols by splitting each first symbol into second symbols having the predefined bit size, by encoding the second symbols, and by combining each of the encoded second symbols according to the communication protocol; and
communicating the encoded symbols over the power distribution lines based on timing indicated at least in part by the alternating current.

2. The method of claim 1, further including the step of generating the first symbols, wherein constructing encoded symbols using an encoding operation includes generating parity data using a Reed-Solomon algorithm.

3. The method of claim 2, further including the step of using a circuit-based encoder to execute the Reed-Solomon algorithm, wherein said splitting of each first symbol into second symbols having the predefined bit size facilitates at least one of an offset of look-up-table memory space or computation-time required for the encoding.

4. The method of claim 1, wherein generating at least two second symbols includes generating a number of second symbols based upon a number of bits in the respective one of the first symbols for which the second symbols are created, and upon a maximum number of bits that can be encoded via the encoding operation for each second symbol.

5. The method of claim 1, wherein encoding the second symbols includes using one of a lookup table with the second symbols to encode the second symbols, and an algorithm with the second symbols to encode the second symbols.

6. The method of claim 1, wherein the steps of generating at least two second symbols and constructing encoded symbols are carried out within a computer processor.

7. The method of claim 1, wherein generating at least two second symbols includes generating the second symbols from symbols having a plurality of bits including at least one of electrical usage data, peak energy use data, gas usage data, water usage data, diagnostic data, and voltage-based data.

8. The method of claim 1, further including, after communicating the encoded symbols, extracting second symbols from the communicated encoded symbols, decoding the extracted second symbols and combining the extracted second symbols to regenerate the multitude of first symbols.

9. The method of claim 1, further including, for encoded symbols communicated from different sources providing different sizes of second symbols, extracting and decoding second symbols from the communicated encoded symbols according to a second symbol size for the source of the communicated encoded symbols, and combining the decoded second symbols to regenerate the first symbols.

10. An apparatus for communicating data over power distribution lines carrying alternating current using a communication protocol for communicating data between endpoint devices and an upstream data-collecting device, based on timing indicated at least in part by the alternating current, the apparatus comprising:
an encoding circuit configured and arranged to, for each of a multitude of first symbols having a plurality of bits,
generate at least two second symbols respectively including different subsets of the bits in the first symbol, and
construct encoded symbols by, using an encoding operation that operates on entire symbols having a predefined bit size that is smaller than the bit size of the first symbols, encoding and combining each of the second symbols according to the communication protocol, wherein the encoding circuit includes
a buffer circuit configured and arranged to buffer the first symbols,
a bitwise AND/shift circuit connected to receive an output of the first symbols from the buffer circuit and configured and arranged to generate the at least two second symbols,
an encoder circuit connected to receive the second symbols from the bitwise AND/shift circuit and configured and arranged to encode the second symbols,
a bitwise OR/shift circuit connected to receive the encoded second symbols from the encoder circuit and configured and arranged to combine the encoded second symbols, and
a buffer circuit connected to the bitwise OR/shift circuit and configured and arranged to provide the combined encoded second symbols for communication on the power distribution lines; and a communication circuit configured and arranged to communicate the encoded symbols over the power distribution lines.

11. The apparatus of claim 10, wherein the encoding circuit is further configured and arranged to encode the second symbols using a Reed-Solomon encoding operation to generate parity bits, and to combine the encoded second symbols and parity bits according to a communication protocol for the power distribution lines.

12. The apparatus of claim 11, wherein the encoding circuit is configured and arranged to encode and combine the second symbols by
splitting each first symbol into second symbols having a predefined bit size corresponding to the Reed-Solomon encoding operation,
encoding the second symbols using a Reed-Solomon encoding operation that operates on entire symbols having the predefined bit size, and therein providing encoded second symbols with parity bits, and
constructing the encoded symbols by combining the second symbols with parity bits as processed via the Reed-Solomon encoding function.

13. The apparatus of claim 10, wherein the encoding circuit is configured and arranged to generate the at least two second symbols by generating a number of second symbols based upon a number of bits in the respective one of the multitude of symbols for which the second symbols are created, and based upon a predetermined maximum number of bits that can be encoded for each second symbol.

14. The apparatus of claim 10, further including an extraction circuit configured and arranged to extract second symbols from the communicated encoded symbols, decode the extracted second symbols and combine the extracted second symbols to regenerate the first symbols.

15. The apparatus of claim 14, wherein the extraction circuit is configured and arranged to extract second symbols from encoded symbols communicated from different sources providing different sizes of second symbols, to decode the second symbols from the communicated encoded symbols according to a second symbol size for the source of the communicated encoded symbols, and to combine the decoded second symbols to regenerate respective first symbols presented at each of the sources.

16. An apparatus for communicating data over power distribution lines carrying alternating current using a communication protocol for communicating data between endpoint devices and an upstream data-collecting device, based on timing indicated at least in part by the alternating current, the apparatus comprising:

an encoding circuit configured and arranged to, for each of a multitude of first symbols having a plurality of bits,
generate at least two second symbols respectively including different subsets of the bits in the first symbol, and
construct encoded symbols by, using an encoding operation that operates on entire symbols having a predefined bit size that is smaller than the bit size of the first symbols, encoding and combining each of the second symbols according to the communication protocol, wherein
the encoding circuit includes
a first circuit including a buffer circuit and an AND circuit, the first circuit being configured and arranged to generate the at least two second symbols,
an encoder circuit connected to receive the second symbols from the first circuit and configured and arranged to encode the second symbols, and
a second circuit including a bitwise OR/shift circuit and a buffer circuit, the second circuit being connected to receive the encoded second symbols from the encoder circuit, and configured and arranged to combine the encoded second symbols to generate the encoded symbols, and to provide the encoded symbols for communication on the power distribution lines,
an extraction circuit configured and arranged to extract second symbols from the communicated encoded symbols, decode the extracted second symbols and combine the extracted second symbols to regenerate the first symbols, wherein the extraction circuit includes
a third circuit including a buffer circuit and an AND circuit, the third circuit being connected to receive the encoded symbols via the power distribution lines, and configured and arranged to regenerate the at least two second symbols,
a decoder circuit connected to receive the regenerated encoded second symbols from the third circuit and configured and arranged to decode the regenerated encoded second symbols, and
a fourth circuit including a bitwise OR/shift circuit and a buffer circuit, the fourth circuit being connected to receive the decoded second symbols from the decoder circuit, and configured and arranged to combine the decoded second symbols and provide the combined decoded second symbols for access; and
a communication circuit configured and arranged to communicate the encoded symbols over the power distribution lines.

\* \* \* \* \*